United States Patent
Seo et al.

(10) Patent No.: US 9,510,351 B2
(45) Date of Patent: *Nov. 29, 2016

(54) METHOD AND APPARATUS FOR TRANSMITTING SIGNAL VIA RELAY BACKHAUL LINK

(71) Applicant: LG Electronics Inc., Seoul (KR)

(72) Inventors: Han Byul Seo, Anyang-si (KR); Hak Seong Kim, Anyang-si (KR); Dae Won Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 78 days.

This patent is subject to a terminal disclaimer.

(21) Appl. No.: 14/532,788

(22) Filed: Nov. 4, 2014

(65) Prior Publication Data

US 2015/0055548 A1 Feb. 26, 2015

Related U.S. Application Data

(63) Continuation of application No. 13/518,539, filed as application No. PCT/KR2011/000610 on Jan. 28, 2011, now Pat. No. 8,908,590.

(60) Provisional application No. 61/299,323, filed on Jan. 28, 2010.

(30) Foreign Application Priority Data

Jan. 28, 2011 (KR) .................. 10-2011-0008625

(51) Int. Cl.
*H04W 72/04* (2009.01)
*H04B 7/155* (2006.01)
(Continued)

(52) U.S. Cl.
CPC ......... *H04W 72/0446* (2013.01); *H04B 7/155* (2013.01); *H04L 5/00* (2013.01);
(Continued)

(58) Field of Classification Search
CPC . H04L 5/0053; H04L 5/0023; H04L 5/0048; H04L 5/0007; H04L 5/0094; H04L 5/001; H04L 2001/0097
See application file for complete search history.

(56) References Cited

U.S. PATENT DOCUMENTS

2007/0133388 A1 6/2007 Lee et al.
2008/0095038 A1 4/2008 Chang et al.
(Continued)

FOREIGN PATENT DOCUMENTS

CN 101043247 A 9/2007
WO WO 2010/068047 A2 6/2010

OTHER PUBLICATIONS

CATT, CMCC, "Downlink Demodulation RS Design," 3GPP TSG RAN WG1 meeting #58, R1-093519, Aug. 24-28, 2009, 6 pages.
(Continued)

*Primary Examiner* — Jung Park
(74) *Attorney, Agent, or Firm* — Birch, Stewart, Kolasch & Birch, LLP

(57) ABSTRACT

A method for receiving a signal by a relay in a wireless communication system. The method according to an embodiment includes receiving, by the relay from a base station (BS), a reference signal (RS) in a subframe having a first slot and a second slot. Each of the first and second slots includes a plurality of consecutive resource elements over which the RS is allowed to be spread, and the plurality of consecutive resource elements overlaps a last Orthogonal Frequency Division Multiplexing (OFDM) symbol of a corresponding slot. When a last OFDM symbol of the subframe is not available for transmission from the BS to the relay, the RS is received only in the first slot of the subframe and a data signal is received in at least part of the plurality of consecutive resource elements in the second slot.

14 Claims, 17 Drawing Sheets

(51) Int. Cl.
*H04L 27/26* (2006.01)
*H04L 5/00* (2006.01)

(52) U.S. Cl.
CPC ......... *H04L 5/0048* (2013.01); *H04L 5/0051* (2013.01); *H04L 27/2627* (2013.01); *H04W 72/0426* (2013.01); *H04L 5/0016* (2013.01); *H04L 5/0023* (2013.01); *H04L 5/0053* (2013.01)

(56) References Cited

U.S. PATENT DOCUMENTS

2009/0274100 A1 11/2009 Montojo et al.
2010/0080139 A1 4/2010 Palanki et al.
2010/0246376 A1 9/2010 Nam et al.
2011/0164550 A1 7/2011 Chen et al.

OTHER PUBLICATIONS

LG Electronics Inc., "DM-RS Design for Higher Order MIMO," 3GPP TSG RAN WG 1 Meeting #58, Agenda Item 15.1, R1-093236, Aug. 24-28, 2009, Shenzhen, China, 6 pages.
Qualcomm Europe, "UE-RS Patterns for Rank 3-4," 3GPP TSG-RAN WG1 #58bis, Agenda Item 7.3.1, R1-094211, Oct. 12-16, 2009, Miyazaki, Japan, 8 pages.
Samsung, "Discussion on DM-RS for LTE-Advanced," 3GPP TSG RAN WG1 #58, R1-093376, Aug. 24-28, 2009, 6 pages.
ZTE, "Design of Demodulation Reference Signals in Backhaul Downlink," TSG-RAN WG1 #59, Agenda Item 7.8.1.6, R1-094747, Nov. 9-13, 2009, Jeju, Korea, 4 pages.

(a) NORMAL CP            (b) EXTENDED CP

METHOD AND APPARATUS FOR TRANSMITTING SIGNAL VIA RELAY BACKHAUL LINK

This application is a continuation of U.S. application Ser. No. 13/518,539 filed on Jun. 22, 2012 (now U.S. Pat. No. 8,908,590 issued on Dec. 9, 2014), which is the National Phase of PCT/KR2011/000610 filed on Jan. 28, 2011, which claims priority under 35 U.S.C. §119(e) to U.S. Provisional Application No. 61/299,323 filed on Jan. 28, 2010 and under 35 U.S.C. §119(a) to Patent Application No. 107-2011-0008625 filed in the Republic of Korea on Jan. 28, 2011. The contents of all of these applications are hereby incorporated by reference as fully set forth herein in their entirety.

FIELD OF THE INVENTION

The present invention relates to wireless communication, and more particularly, to a method and apparatus for transmitting a signal via a relay backhaul link.

DISCUSSION OF THE RELATED ART

Wireless communication systems have been widely deployed to provide various types of communication services including voice and data services. In general, a wireless communication system is a multiple access system that supports communication of multiple users by sharing available system resources (e.g. a bandwidth, transmission power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

An object of the present invention devised to solve the problem lies on a method and apparatus for efficiently transmitting a signal in a relay system. Another object of the present invention devised to solve the problem lies on a method and apparatus for efficiently transmitting a reference signal and/or data in a relay system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

SUMMARY

The object of the present invention can be achieved by providing a method for transmitting a signal to a relay at a Base Station (BS) in a wireless communication system, including mapping a Reference Signal (RS) to a subframe having two slots, and transmitting the subframe to the relay. Each of the slots includes a plurality of consecutive resource elements over which the RS can be spread and the plurality of consecutive resource elements are overlapped with a last Orthogonal Frequency Division Multiplexing (OFDM) symbol of the slot. If a last OFDM symbol of the subframe is not available to the relay, the RS is transmitted only in a first slot of the subframe.

In another aspect of the present invention, provided herein is a BS in a wireless communication system, including a Radio Frequency (RF) unit and a processor. The processor is adapted to map an RS to a subframe having two slots, and transmit the subframe to the relay. Each of the slots includes a plurality of consecutive resource elements over which the RS can be spread and the plurality of consecutive resource elements are overlapped with a last OFDM symbol of the slot. If a last OFDM symbol of the subframe is not available to the relay, the RS is transmitted only in a first slot of the subframe.

If the last OFDM symbol of the subframe is available to the relay, the RS may be transmitted in the two slots of the subframe.

The plurality of consecutive resource elements may be consecutive in time in each of the slots.

The plurality of consecutive resource elements may be two resource elements consecutive in time in each of the slots.

If the RS is transmitted only in the first slot of the subframe, a data signal may be mapped to at least part of the plurality of consecutive resource elements in which the reference signal can be spread in a second slot of the subframe. In this case, the data signal may be mapped to remaining resource elements except resource elements overlapped with the last OFDM symbol of the subframe among the plurality of consecutive reference elements in the second slot of the subframe. The data signal may be spread with an orthogonal code used for transmitting the RS in the plurality of consecutive resource elements in the second slot of the subframe.

ADVANTAGEOUS EFFECTS OF INVENTION

In accordance with embodiments of the present invention, a signal can be efficiently transmitted in a relay system. Particularly, a reference signal and/or data can be efficiently transmitted in the relay system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Reference will now be made in detail to the preferred embodiments of the present invention, examples of which are illustrated in the accompanying drawings. Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data, Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
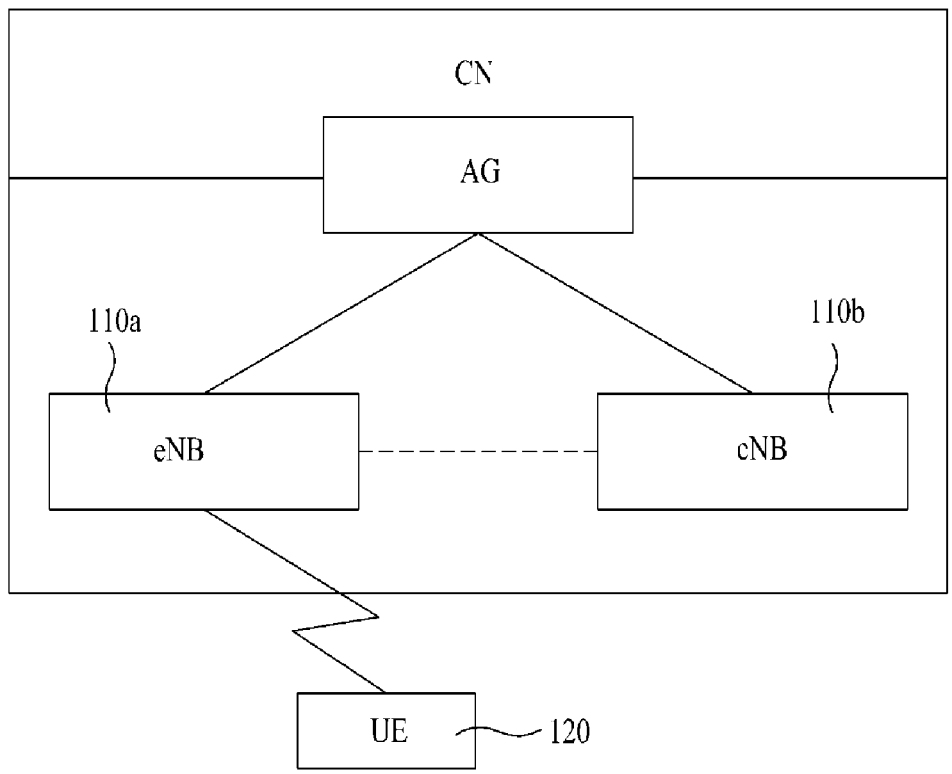
FIG. 1 illustrates a network configuration for an Evolved Universal Mobile Telecommunications System (E-UMTS) system.

FIG. 1 illustrates a network configuration for an E-UMTS system. E-UMTS is an evolution of Wideband CDMA (WCDMA) UMTS and the 3GPP is working on standardization of E-UMTS. E-UMTS is also called LTE. For details of UMTS and E-UMTS technical specifications, refer respectively to Release 7 and Release 8 of "3rd Generation Partnership Project; Technical Specification Group Radio Access Network".

Referring to FIG. 1, the E-UMTS system includes a User Equipment (UE) 120, evolved Node Bs (eNBs or eNode Bs) 110a, and 110b, and an Access Gateway (AG) which is connected to an external network, at an end of an Evolved UMTS Terrestrial Radio Access Network (E-UTRAN). An eNB can simultaneously transmit multiple data streams for a multicast service and/or a unicast service. One eNB manages one or more cells (e.g. three cells). A cell is configured to provide a downlink or uplink transmission service to a plurality of UEs in one of bandwidths 1.4, 3, 5, 10, 15 and 20 MHz. Different cells may be set to different bandwidths. An eNB controls data transmission and reception for a plurality of UEs. For downlink data, the eNB notifies a UE of a time/frequency area to carry the downlink data, a coding scheme, a data size, Hybrid Automatic Repeat reQuest (HARQ)-related information, etc. by transmitting downlink scheduling information. For uplink data, the eNB notifies a UE of a time/frequency area available to the UE, a coding scheme, a data size, HARQ-related information, etc. by transmitting uplink scheduling information. An interface may be established between eNBs to transmit user traffic or control traffic. A Core Network (CN) may include an AG and a network node for user registration of UEs. The AG manages the mobility of a UE on a Tracking Area (TA) basis. A TA includes a plurality of cells.

Figure 2:
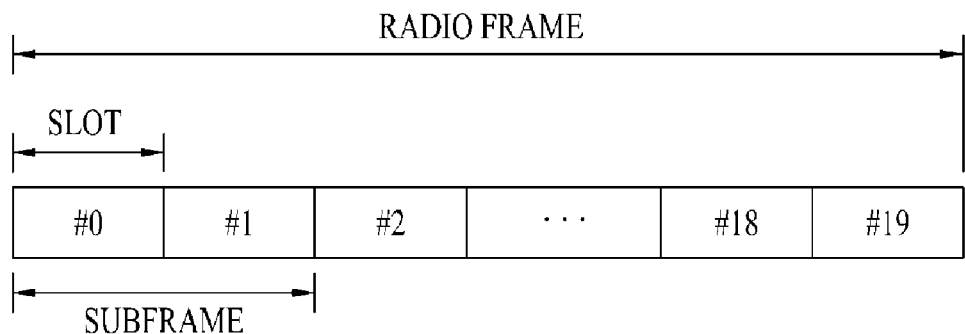
FIG. 2 illustrates a radio frame structure in the E-UMTS system.

FIG. 2 illustrates a radio frame structure in the E-UMTS system.

Referring to FIG. 2, the E-UMTS system uses a 10-ms radio frame. The radio frame is divided into 10 subframes. Each subframe is further divided into two slots, each being 0.5 ms in duration and having a plurality of symbols (e.g. OFDM symbols or SC-FDMA symbols).

Figure 3:
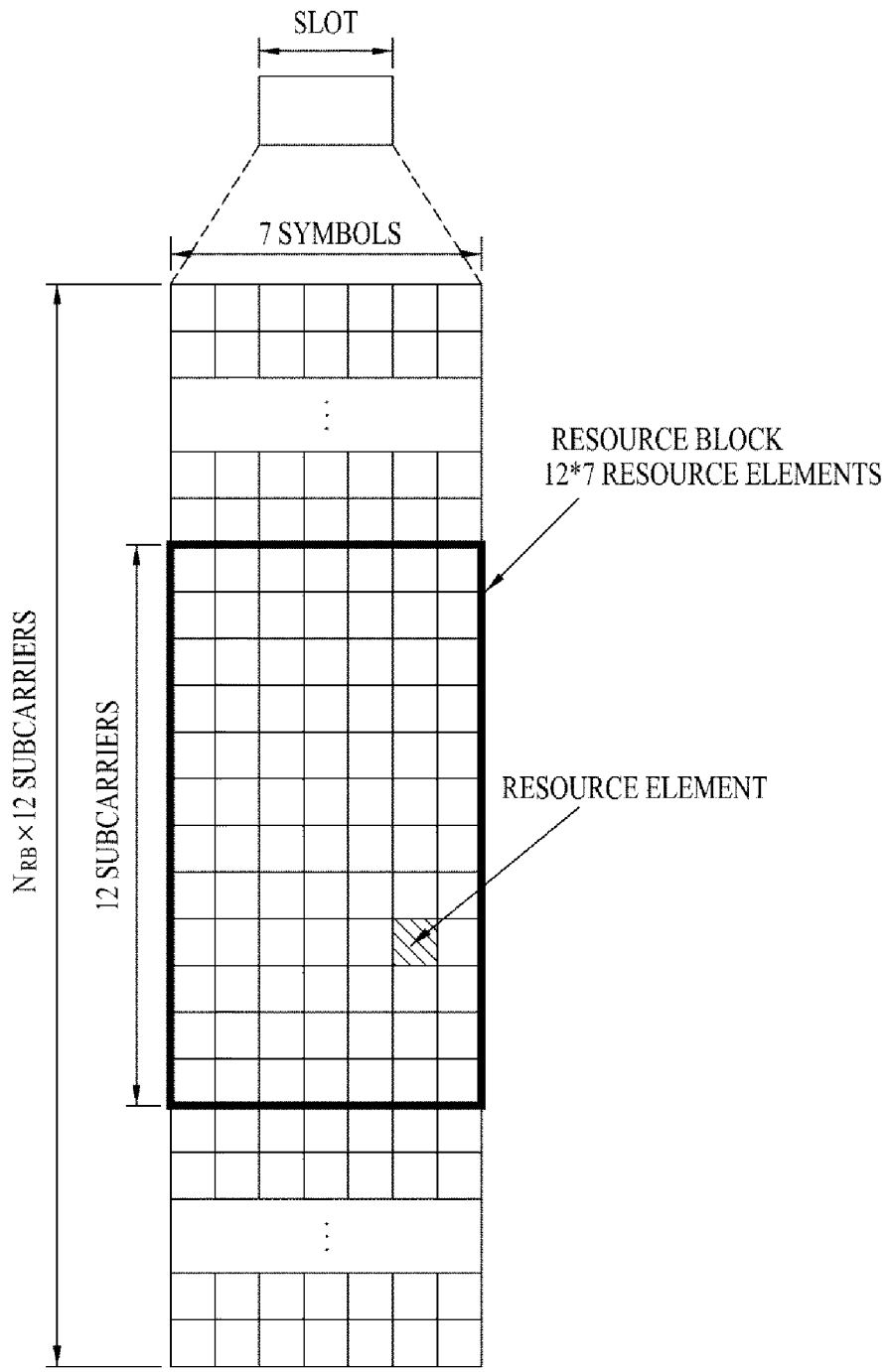
FIG. 3 illustrates the structure of a resource grid for a radio frame.

FIG. 3 illustrates the structure of a resource grid for the duration of one slot.

Referring to FIG. 3, a slot includes a plurality of OFDM symbols or SC-FDMA symbols in time by a plurality of Resource Blocks (RBs) in frequency. One RB has 12×7(6) Resource Elements (REs). The number of RBs in a time slot depends on a bandwidth set for a cell. Each element in the resource grid is referred to as an RE. An RE is the smallest unit of resources, including one subcarrier for a duration of one symbol. While a time slot and an RB are shown in FIG. 3 as including 7 symbols and 12 subcarriers, respectively, this is purely exemplary and thus does not limit the present invention. For example, the number of symbols per slot depends on the length of a Cyclic Prefix (CP).

Figure 4:
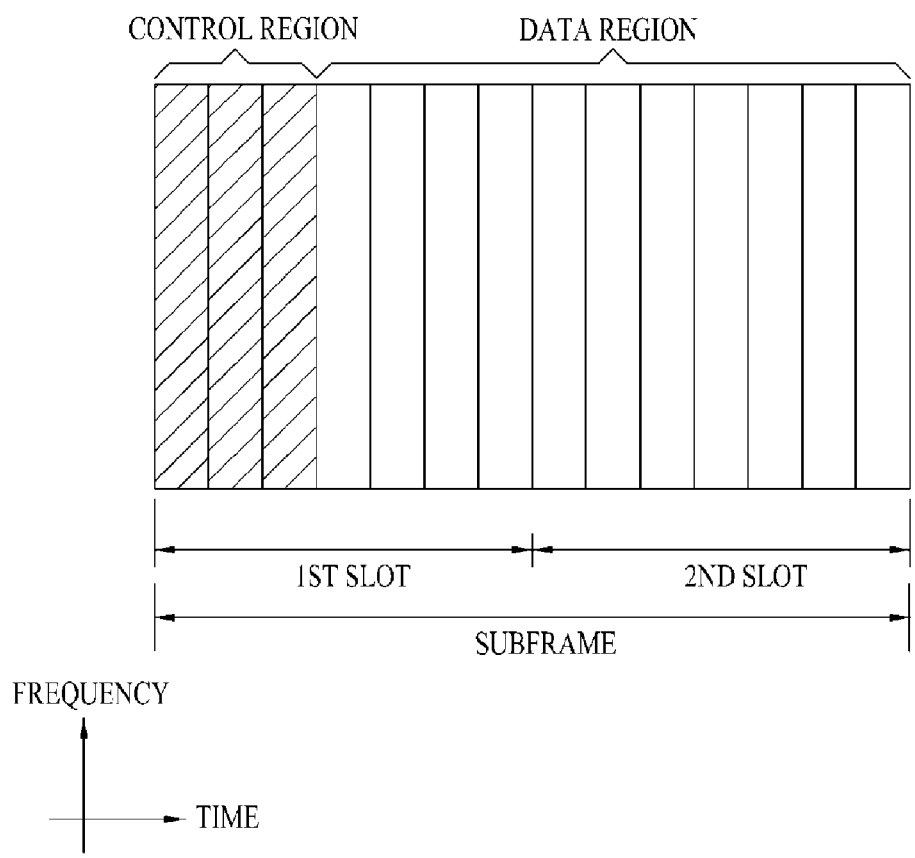
FIG. 4 illustrates a downlink subframe structure.

FIG. 4 illustrates a downlink subframe structure.

Referring to FIG. 4, a Layer 1 (L1)/Layer 2 (L2) control region is multiplexed with a data region in Time Division Multiplexing (TDM) in a downlink subframe in an LTE system. The L1/L2 control region occupies the first n OFDM symbols (e.g. the first three or four OFDM symbols) of the downlink subframe and the data region occupies the remaining OFDM symbols of the downlink subframe. The L1/L2 control region includes a Physical Downlink Control CHannel (PDCCH) for carrying downlink control information and the data region includes a downlink data channel, Physical Downlink Shared CHannel (PDSCH). To receive a downlink signal, a UE reads downlink scheduling information from the PDCCH. Then the UE receives downlink data on the PDSCH based on resource allocation information indicated by the downlink scheduling information. Resources scheduled for the UE (i.e. the PDSCH) are allocated on an RB basis or on an RB group basis.

The PDCCH delivers information related to resource allocation for transport channels, a Paging CHannel (PCH) and a Downlink Shared CHannel (DL-SCH), an uplink scheduling grant, and HARQ information to the UE. Control information carried on the PDCCH is generically called Downlink Control Information (DCI). Various DCI formats are defined according to the contents of DCI.

Table 1 illustrates DCI format 0 for uplink scheduling.

TABLE 1

| Field | Bits | Comment |
| --- | --- | --- |
| Format | 1 | Uplink grant or downlink assignment |
| Hopping flag | 1 | Frequency hopping on/off |
| RB assignment | 7 | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

MCS: Modulation and Coding Scheme.
TPC: Transmit Power Control
RNTI: Radio Network Temporary Identifier
CRC: Cyclic Redundancy Check A UE for which a PDCCH is destined is identified by an RNTI. For instance, on the assumption that the CRC of a PDCCH is masked by RNTI A and the PDCCH delivers uplink resource allocation information B (e.g., frequency positions) and transport format information C (e.g. a transport block size, a modulation scheme, coding information, etc.), UEs monitor PDCCHs using their own RNTIs within a cell and a UE having RNTI A transmits an uplink signal based on the information B and C acquired from the PDCCH with RNTI A.

Figure 5:
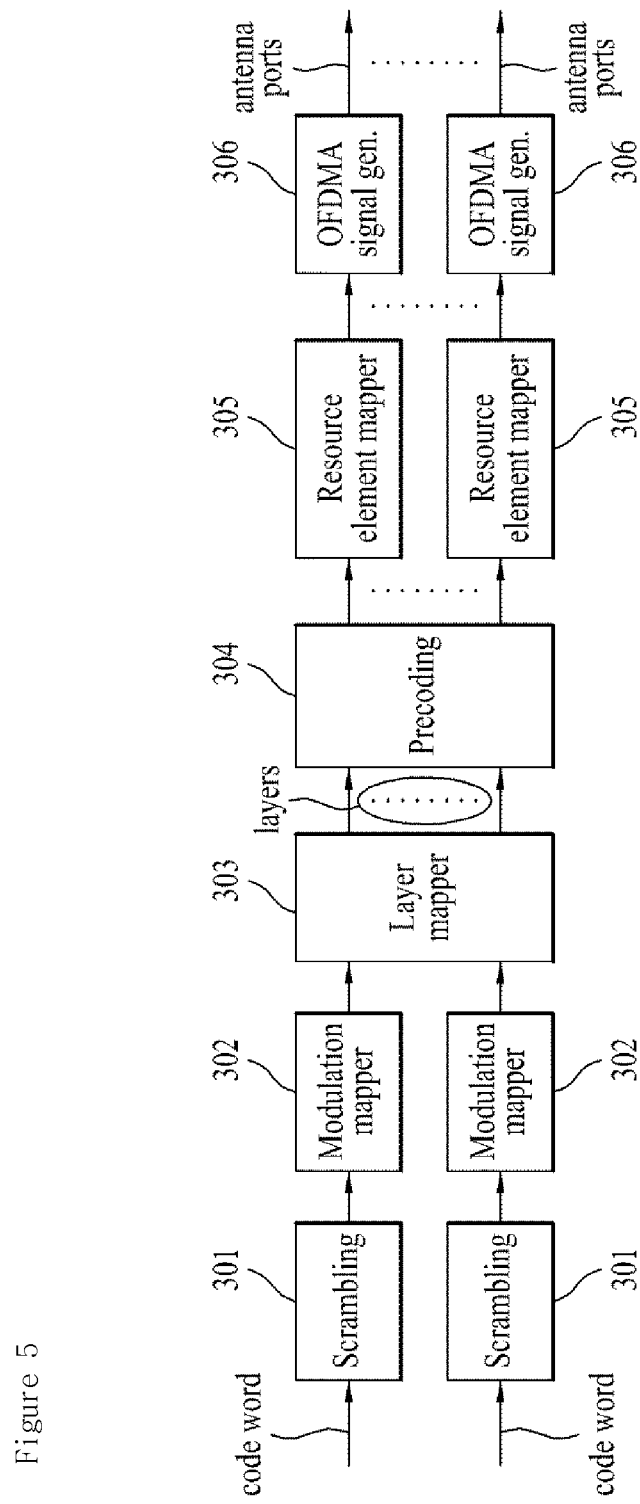
FIG. 5 illustrates a signal transmission operation in a Multiple Input Multiple Output (MIMO) scheme.

FIG. 5 illustrates an exemplary signal transmission operation according to a Multiple Input Multiple Output (MIMO) scheme.

Referring to FIG. 5, scramblers 301 scramble codewords. Each codeword includes a coded bit stream corresponding to a transport block. Modulation mappers 302 modulate the scrambled codewords to complex symbols in Binary Phase Shift Keying (BPSK), Quadrature Phase Shift Keying (QPSK), 16-ary Quadrature Amplitude Modulation (16 QAM), or 64-ary Quadrature Amplitude Modulation (64 QAM) according to the type of the transmission signal and/or a channel state. A layer mapper 303 maps the complex symbols to one or more layers.

In the case of signal transmission through a single antenna, one codeword is mapped to one layer. In the case of signal transmission through multiple antennas, the codeword-to-layer mapping relationship may vary depending on a transmission scheme. Table 2 and Table 3 illustrate exemplary codeword-to-layer mapping relationships.

TABLE 2

| Number of layers | Number of code words | Codeword-to-layer mapping $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

TABLE 3

| Number of layers | Number of code words | Codeword-to-layer mapping $i = 0, 1, \ldots, M_{symb}^{layer} - 1$ | |
| --- | --- | --- | --- |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ If $M_{symb}^{(0)} \bmod 4 \neq$ two null symbols shall be appended to $d^{(0)}(M_{symb}^{(0)} - 1)$ |

Table 2 describes codeword-to-layer mapping for spatial multiplexing and Table 3 describes codeword-to-layer mapping for transmit diversity. In Table 2 and Table 3, x(a)(i)

represents an $i^{th}$ symbol of a layer with index a, and d(a)(i) represents an $i^{th}$ symbol of a codeword with index a.

As noted from Table 2 and Table 3, one codeword may be mapped to one layer on a symbol basis. However, as in the second case of Table 3, one codeword may be distributed to up to four layers. In the distributed codeword-to-layer mapping, the symbols of each codeword are sequentially mapped to layers.

While Table 2 and Table 3 are based on the assumption of up to two codewords and up to four layers, this is illustrative. Thus the maximum numbers of codewords and layers for signal transmission may vary depending on systems.

A precoder 304 multiplies the layer-mapped signals by a preceding matrix selected according to a channel state and allocates the multiplied signals to transmission antennas. RE mappers 305 map the transmission signals for the respective antennas to time-frequency REs. Then OFDM signal generators 306 transmit the mapped transmission signals through the respective antennas.

Figure 6:
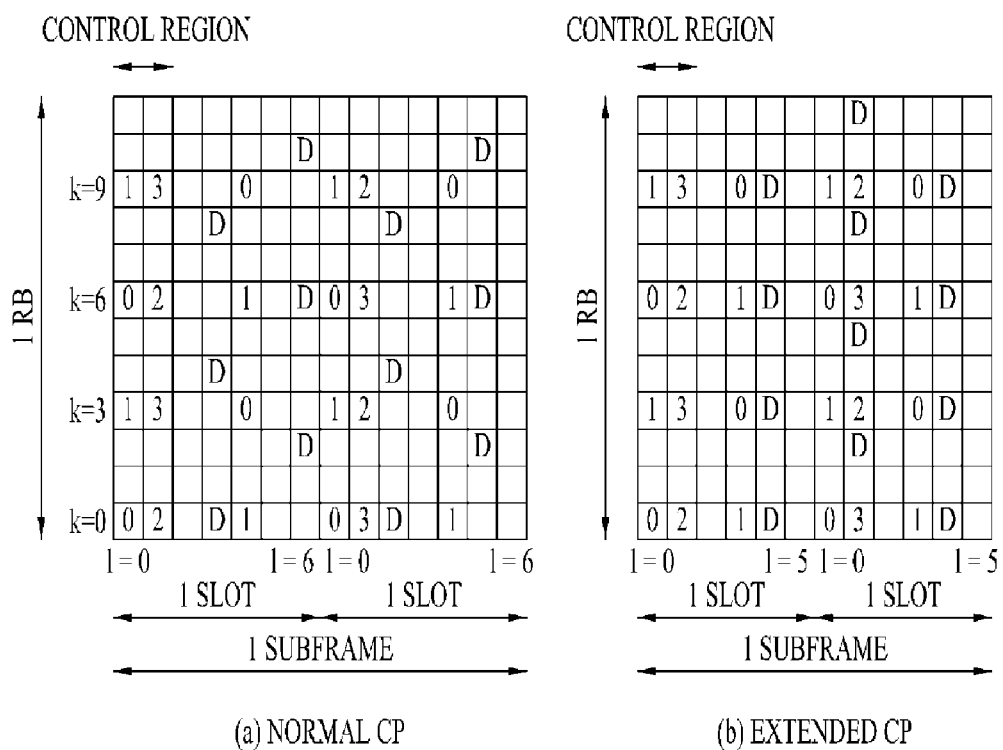
FIG. 6 illustrates downlink Reference Signal (RS) patterns in a Long Term Evolution (LTE) system.

FIG. 6 illustrates downlink Reference Signal (RS) patterns in the LTE system.

Referring to FIG. 6, two types of downlink RSs are defined for a unicast service in the LTE system, Common RSs (CRSs) 0 to 3 targeting channel state information acquisition and measurements, for example, for handover and UE-specific RSs targeting data modulation. The UE-specific RSs are also called dedicated RSs (DRSs). The UE-specific RSs are used to demodulate beamforming data. The CRSs are used for both channel information acquisition and data demodulation. The CRSs are cell-specific and transmitted over a total frequency band in every subframe. Because the LTE system supports up to four Transmission (Tx) antennas on downlink, CRSs for up to four antenna ports may be transmitted according to the number of Tx antennas at an eNB. CRSs are transmitted through antenna ports 0 to 3 and a UE-specific RS D is transmitted through antenna port 5 in the LTE system.

The UE-A system evolved from the LTE system should be able to support up to eight Tx antennas on downlink. Therefore, the LTE-A system should support RSs for up to eight Tx antennas. Since downlink RSs are defined only for up to four Tx antennas in the LTE system. RSs should be additionally defined for additional antenna ports, when an eNB has four to eight downlink Tx antennas in the LTE-A system.

Figure 7:
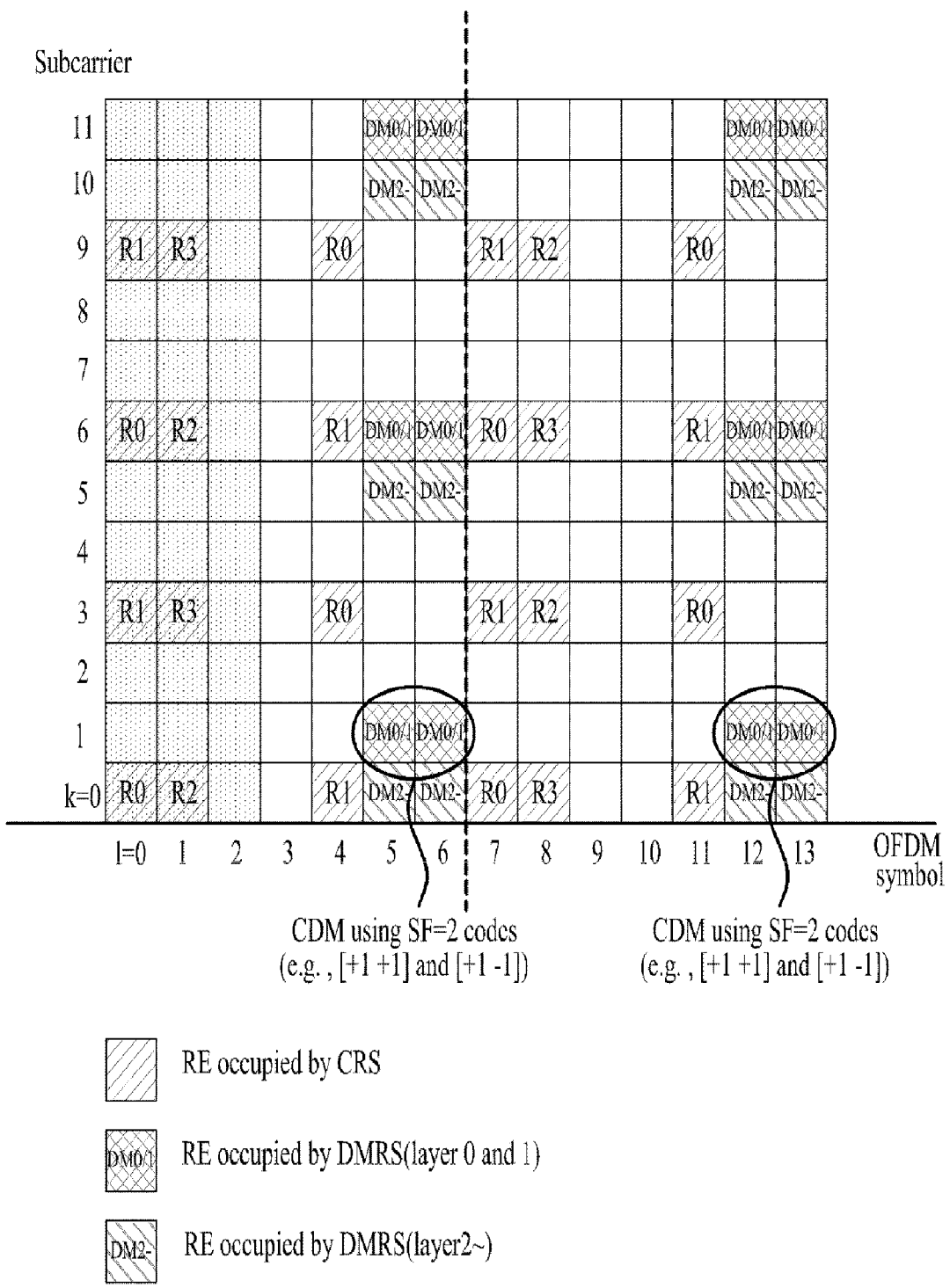
FIG. 7 illustrates a Demodulation Reference Signal (DRS) structure added to an LTE-Advanced (LTE-A) system.

FIG. 7 illustrates an exemplary pattern of Demodulation Reference Signals (DM RSs) added to the LTE-A system. A DM RS is a UE-specific RS used to demodulate each layer signal, when signals are transmitted through multiple antennas. DM RSs are used for demodulation of a PDSCH and a Relay-PDSCH (R-PDSCH). Since the LTE-A system uses up to eight Tx antennas, it needs up to eight layers and DM RSs for the respective layers. For the sake of convenience, DM RSs for layers 0 to 7 are referred to as DM RSs (layers) 0 to 7.

Referring to FIG. 7, DM RSs for two or more layers are multiplexed in Code Division Multiplexing (CDM) over the same REs. To be more specific, the DM RSs for the respective layers are spread with spreading codes (e.g. orthogonal codes such as Wash codes or Discrete Fourier Transform (DFT) codes) and then multiplexed in the same REs. For instance, a DM RS for layer 0 and a DM RS for layer 1 are multiplexed in the same REs. Specifically, the DM RSs for layer 0 and layer 1 are spread with orthogonal codes at subcarrier 1 (k=1) in two OFDM symbols 12 and 13. That is, the DM RSs for layer 0 and layer 1 are spread with codes with Spreading Factor (SF)=2 in time and multiplexed in the same REs in each slot. The spreading codes for the DM RSs for layer 0 and layer 1 may be, for example, [+1 +1] and [+1 −1], respectively. Similarly, DM RSs for layer 2 and layer 3 are spread with different orthogonal codes in the same REs. DM RSs for layers 4, 5, 6 and 7 are spread with codes orthogonal to the spreading codes of the DM RSs for layers 0, 1, 2 and 3 in the REs occupied by the DM RSs 0 & 1 and the DM RSs 2 & 3. For up to four layers, codes with SF=2 are used for DM RSs, whereas for five or more layers, codes with SF=4 are used for DM RSs. In the LTE-A system, antenna ports for DM RSs are given as {7, 8, . . . , n+6} (n is the number of layers).

Table 4 below lists spreading sequences for antenna ports 7 to 14 defined in LTE-A.

TABLE 4

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Referring to Table 4, the same orthogonal code with length 2 is repeated in each of orthogonal codes for antenna ports 7 to 10. As a consequence, orthogonal codes with length 2 are used at a slot level for up to four layers. For five or more layers, orthogonal codes with length 4 are used at a subframe level.

Figure 8:
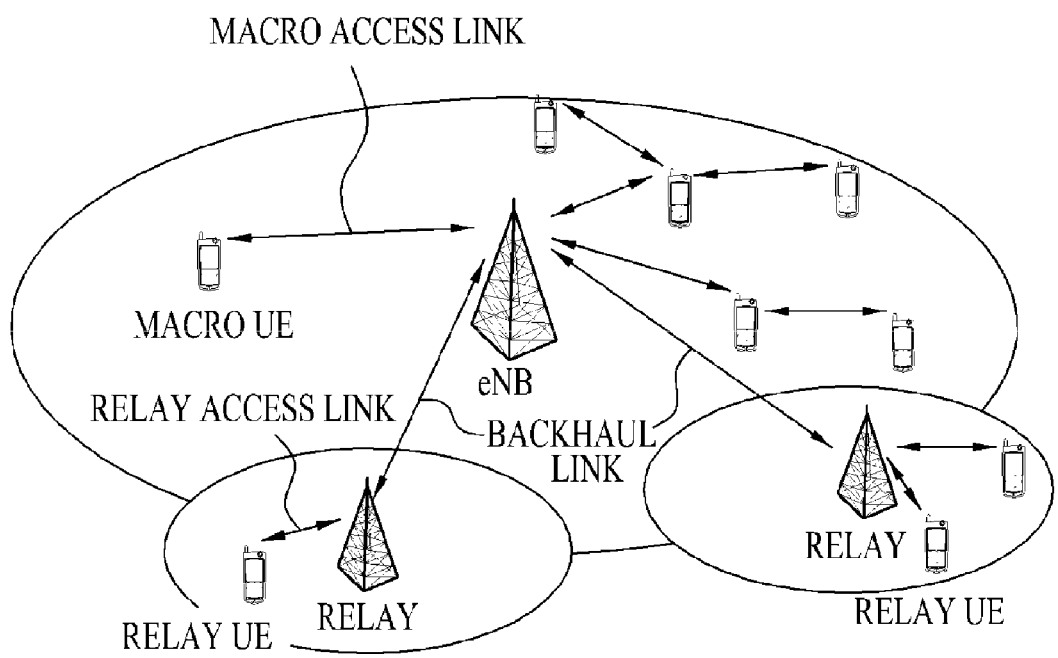
FIG. 8 illustrates a wireless communication system having relays.

FIG. 8 illustrates a wireless communication system having relays. A relay or Relay Node (RN) extends the service area of an eNB or is installed in a shadowing area to thereby provide a reliable service.

Referring to FIG. 8, the wireless communication system includes an eNB, relays, and UEs. The UEs communicate with the eNB or the relays. For the sake of convenience, a UE communicating with an eNB is referred to as a macro UE and a UE communicating with a relay is referred to as a relay UE. A communication link between an eNB and a macro UE and a communication link between a relay and a relay UE are referred to as a macro access link and a relay access link, respectively. A communication link between an eNB and a relay is referred to as a backhaul link.

Figure 9:
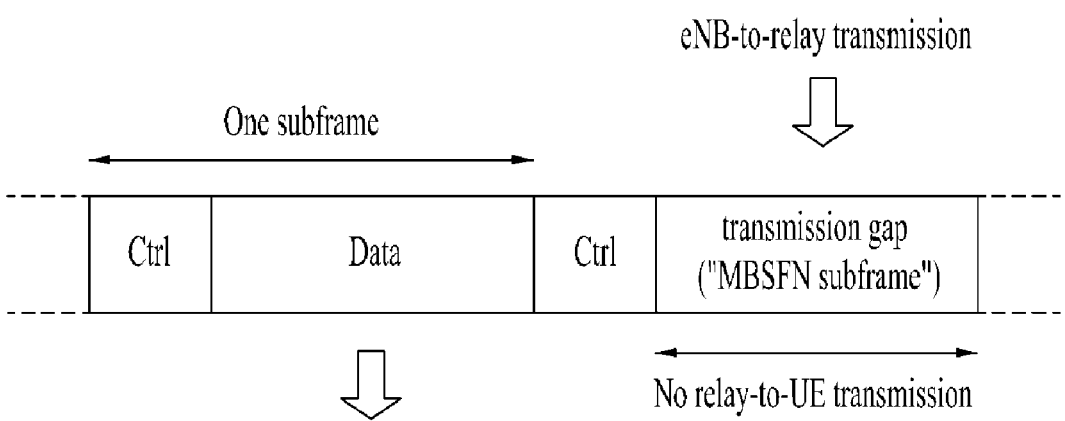
FIG. 9 illustrates an exemplary backhaul transmission in a Multicast Broadcast Single Frequency Network (MBSFN) subframe.

FIG. 9 illustrates an exemplary backhaul transmission in a Multicast Broadcast Single Frequency Network (MBSFN) subframe. For in-band relaying, an eNB-to-relay link (i.e. a backhaul link) operates in the same frequency band as a relay-to-UE link (i.e. a relay access link). In the case where a relay transmits a signal to a UE while it is receiving a signal from an eNB or vice versa, the transmitter and receiver of the relay interfere mutually. Accordingly, simultaneous eNB-to-relay and relay-to-UE transmissions on the same frequency resources may be limited. For this purpose, the backhaul link and the relay access link are partitioned in Time Division Multiplexing (TDM). In the LTE-A system, a backhaul link is established in an MBSFN subframe to support measurements of legacy LTE UEs located in a relay zone (fake MBSFN). If a subframe is signaled as an MBSFN subframe, a UE receives only the control region (ctrl) of the subframe and thus the relay may configure a backhaul link using the data region of the subframe.

Embodiment 1

Due to propagation delay between an eNB and a relay, Reception/Transmission (Rx/Tx) switching of the relay, system setting, the relay may not receive the last OFDM symbol of a backhaul subframe. This is because the relay should switch from Rx mode to a Tx mode at the time of the last OFDM symbol in order to transmit the first OFDM symbol of the next subframe.

Figure 10:
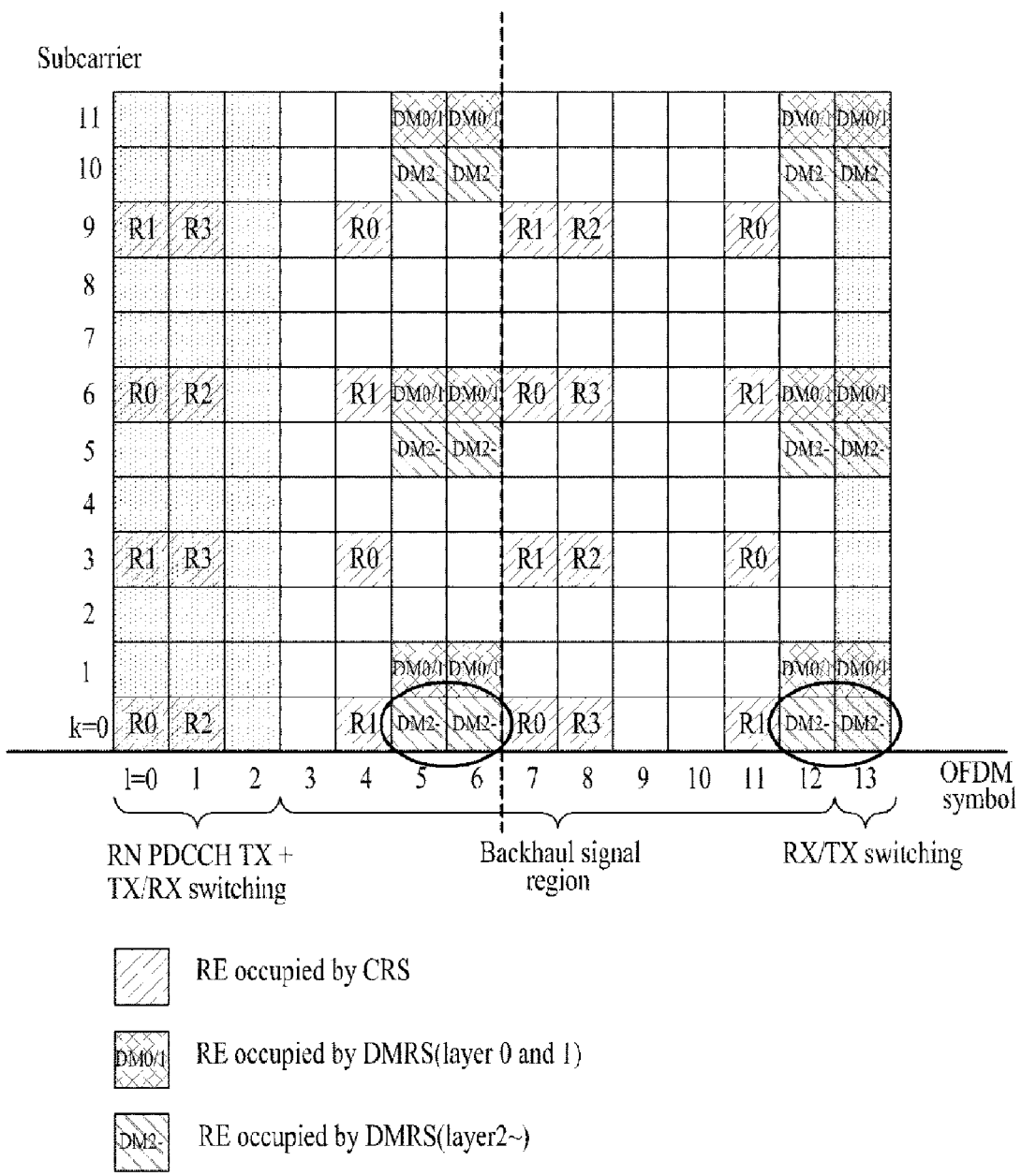
FIG. 10 illustrates an exemplary problem that is produced during DeModulation Reference Signal (DM RS) reception, when a relay fails to receive the last Orthogonal Frequency Division Multiplexing (OFM) symbol of a backhaul subframe.

FIG. 10 illustrates a problem produced during DM RS reception, when a relay fails to receive the last OFDM symbol of a backhaul subframe.

Referring to FIG. 10, if the relay fails to receive the last OFDM symbol with index 13 of a backhaul subframe, the relay does not receive a part of REs allocated to a DM RS. As described before with reference to FIG. 7. DM RSs for two or more layers share the same REs in CDM. Therefore, if the relay does not receive OFDM symbol 13, REs carrying DM RSs in OFDM symbol 12 are not helpful in channel estimation. Without REs of OFDM symbol 13, the relay cannot separate a plurality of DM RSs multiplexed in REs of OFDM symbols 12 and 13 through despreading. As a result, the DM RS REs of OFDM symbol 12 causes unnecessary overhead for backhaul transmission and reception, thereby wasting resources.

To avert this problem, the relay may use DM RS REs of the second last OFDM symbol of a subframe as data REs, if the relay cannot receive the last OFDM symbol of the subframe. For example, if the relay is not capable of receiving OFDM symbol 13 as illustrated in FIG. 10, the eNB transmits a data signal in the DM RS REs of OFDM symbol 12 and the relay decodes its own data including the data carried in the DM RS REs of OFDM symbol 12. In this case, the relay performs channel estimation using only DM RS REs in the first slot of the subframe and decodes the data of the first and second slots based on the channel estimation. That is, if the relay cannot receive the last OFDM symbol of a subframe, RSs are transmitted only in the first slot of the subframe. Consequently, utilization of radio resources can be increased.

Figure 11:
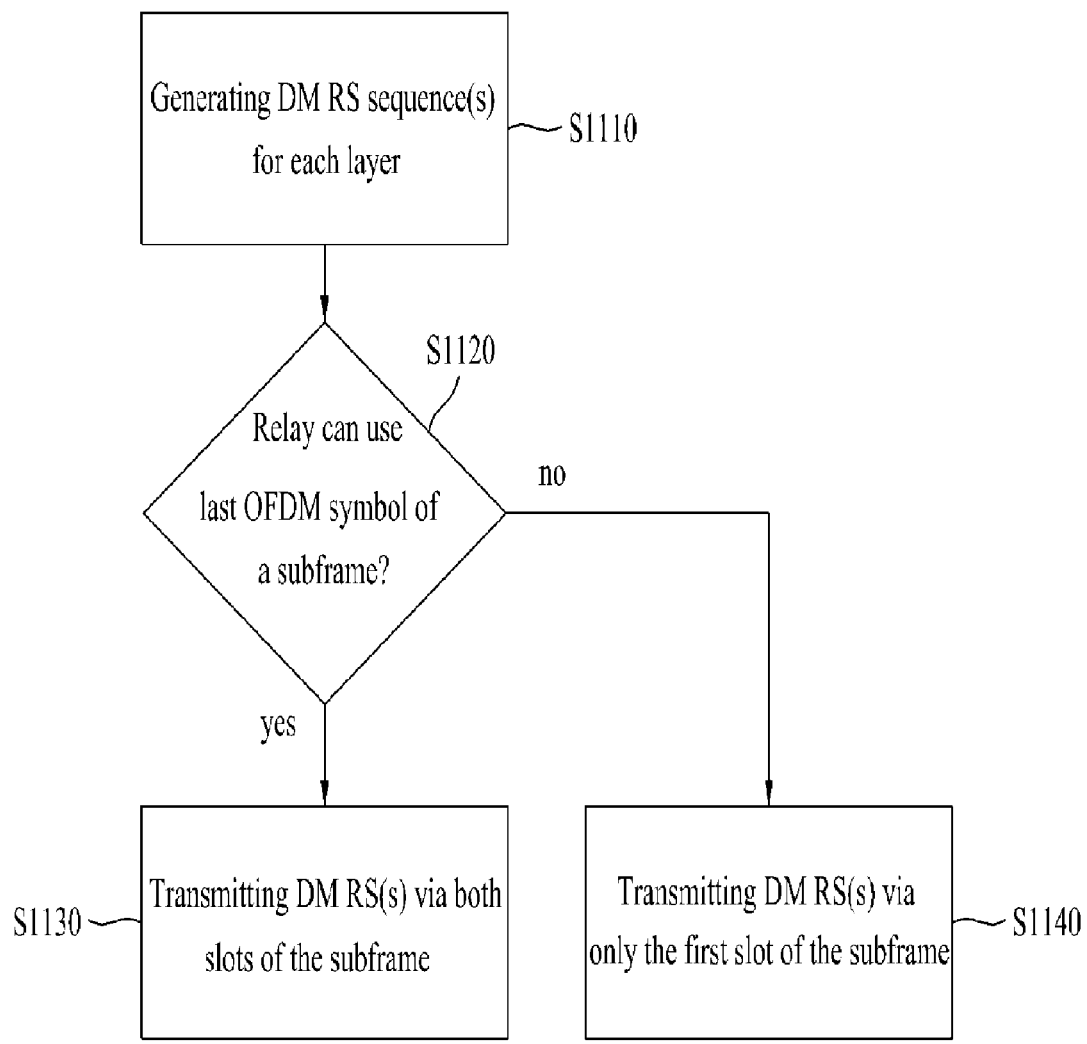
FIGS. 11 and 12 are flowcharts illustrating DM RS transmission operations of an evolved Node B (eNB) according to an embodiment of the present invention.
Figure 12:
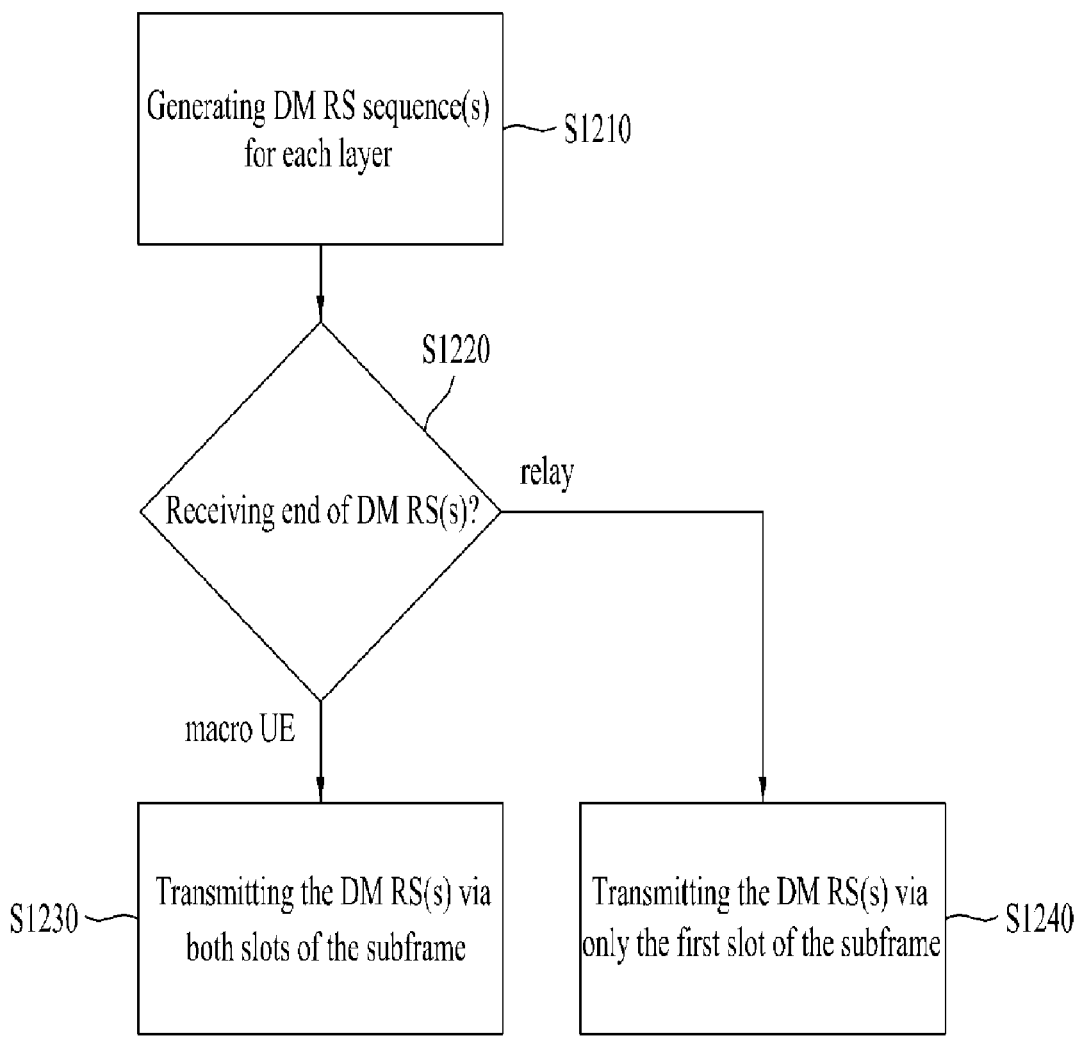
Figure 13:
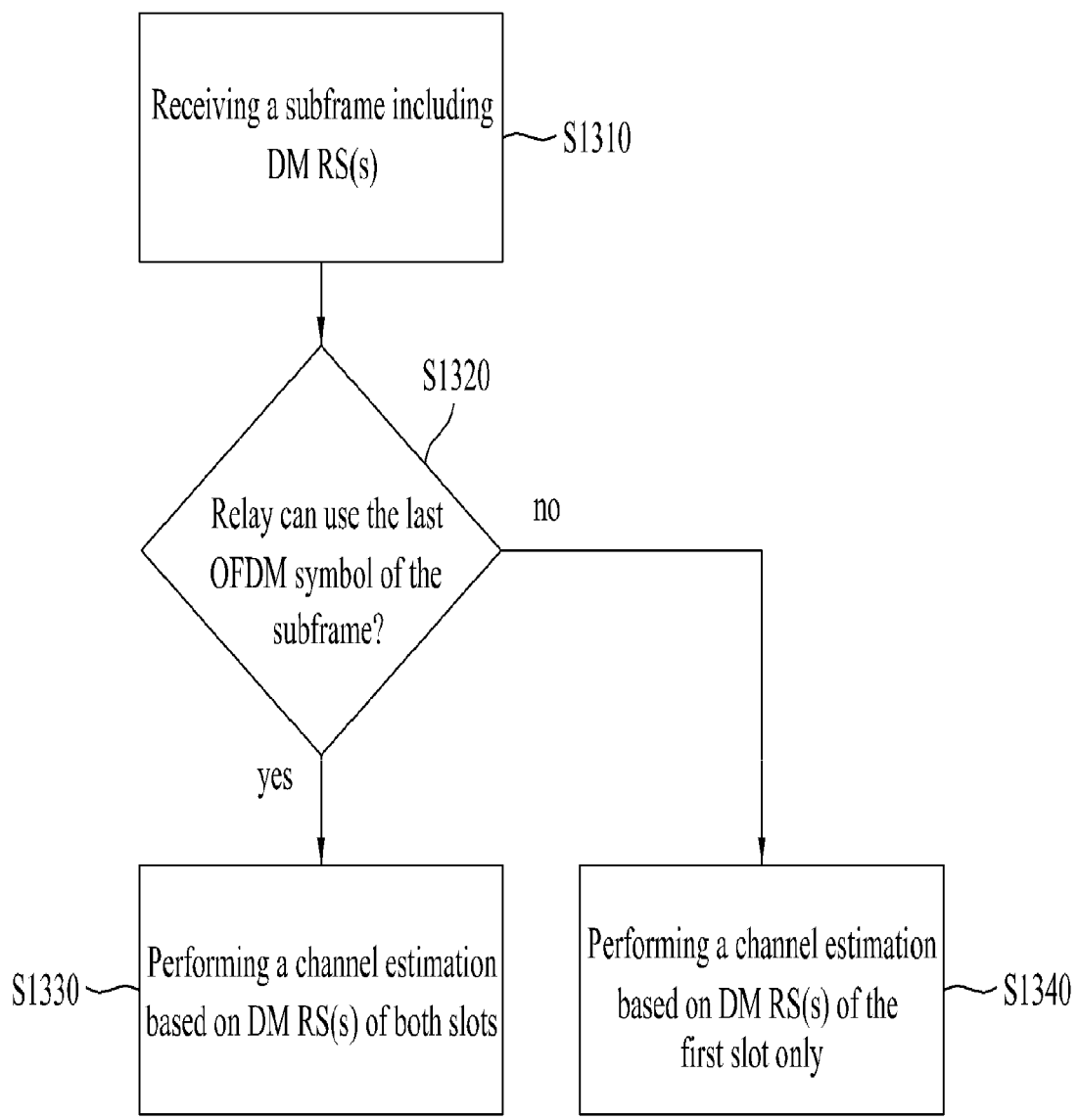
FIG. 13 is a flowchart illustrating a channel estimation operation of a relay according to an embodiment of the present invention.

FIGS. 11, 12 and 13 are flowcharts illustrating signal processing operations according to an embodiment of the present invention. Specifically, FIGS. 11 and 12 illustrate DM RS transmission operations at an eNB and FIG. 13 illustrates a channel estimation operation at a relay.

Retelling to FIG. 11, the eNB generates a DM RS sequence (or DM RS sequences) for each layer (S1110). The DM RS sequence may be, but not limited to, a pseudo-random sequence, a Zanoff-chu sequence, or a Constant Amplitude Zero Auto Correlation (CAZAC) sequence. For example, referring to generation of an RS sequence for antenna port 5 in the legacy LTE system, the DM RS sequence may be defined as MathFigure 1

$$r(m) = \frac{1}{\sqrt{2}}(1 - 2 \cdot c(2m)) + j\frac{1}{\sqrt{2}}(1 - 2 \cdot c(2m+1))$$ [Math. 1]

where m is 0 or a larger integer and c(m) is a pseudo-random sequence given by [Equation 2]. The pseudo-random sequence is defined by Gold sequences of length 31.

MathFigure 2

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Math. 2]

where Nc=1600 and n=1, 2, ..., 30. The first Gold sequence may be initialized to $$x_1(0) = 1, x_1(n) = 0$$

and the second Gold sequence may be initialized to $$c_{init} = (\lfloor n_s/2 \rfloor + 1) \cdot (2N_{ID}^{cell} + 1) \cdot 2^{16} + \alpha \cdot n_s$$

denotes a slot index, $n_s$ $N_{ID}^{cell}$ denotes a cell ID, and a is a constant.

Then the eNB determines whether the relay is capable of using the last symbol of a subframe (S1120). The determination may be made in a different manner according to how subframe boundaries of the eNB and the relay are configured. Therefore, whether or not the last symbol is available to the relay may be indicated by system information or Radio Resource Control (RRC) signaling. If the last symbol of the subframe is available to the relay, the eNB transmits DM RSs in the first and second slots of the subframe (S1130). In this case, the DM RSs may be transmitted in the manner illustrated in FIG. 7. On the other hand, if the last symbol of the subframe is not available to the relay, the eNB transmits a DM RS (or DM RSs) only in the first slot of the subframe (S1140). In other words, the BS does not transmit a DM RS (or DM RSs) in the second slot of the subframe to the relay. In this case, data (an R-PDSCH) may be mapped to DM RS REs of the second slot intended for the relay. Transmission processing of the DM RSs may include, but is not limited to, precoding, RE mapping, and OFDM signal generation.

Referring to FIG. 12, the BS may operate differently according to signal recipients. For the sake of convenience, it is assumed that a relay cannot use the last OFDM symbol of a subframe. The eNB basically operates in a similar manner to that illustrated in FIG. 11. First, the eNB generates a DM RS sequence (or DM RS sequences) for each layer (S1210). Then the eNB determines a receiving end to receive a DM RS (or DM RSs) (S1220). If the eNB is to transmit the DM RS to a macro UE, the BS transmits the DM RS in the first and second slots of the subframe, for example, in the manner illustrated in FIG. 7 (S1230). On the other hand, if the eNB is to transmit the DM RS to a relay, the eNB transmits the DM RS only in the first slot of the subframe to the relay (S1240). That is, no DM RSs are transmitted in the second slot of the subframe to the relay. In this case, data (an R-PDSCH) may be mapped to DM RS REs of the second slot of the subframe, intended for the relay. While the procedures of FIGS. 11 and 12 have been described separately, they may be combined into one procedure.

Referring to FIG. 13, the relay receives a subframe including a DM RS (or DM RSs) from the eNB (S1310). The subframe is a backhaul subframe, preferably an MBSFN subframe. The relay determines whether it can use the last symbol of the subframe (S1320). Whether or not the relay can use the last symbol of the subframe is predetermined or indicated by system information or RRC signaling. If the relay can use the last symbol of the subframe, the relay performs channel estimation using a DM RS (or RSs) received in the first and second slots of the subframe (S1330). In this case, the DM RS (or DM RSs) may be received in the manner illustrated in FIG. 7. On the other hand, if the relay cannot use the last symbol of the subframe, the relay performs channel estimation based on a DM RS (or DM RSs) received in the first slot of the subframe (S1340). That is, no DM RSs are received in the second slot of the subframe. In this case, data (an R-PDSCH) may be mapped to DM RS REs of the second slot of the subframe, intended for the relay.

Figure 14:
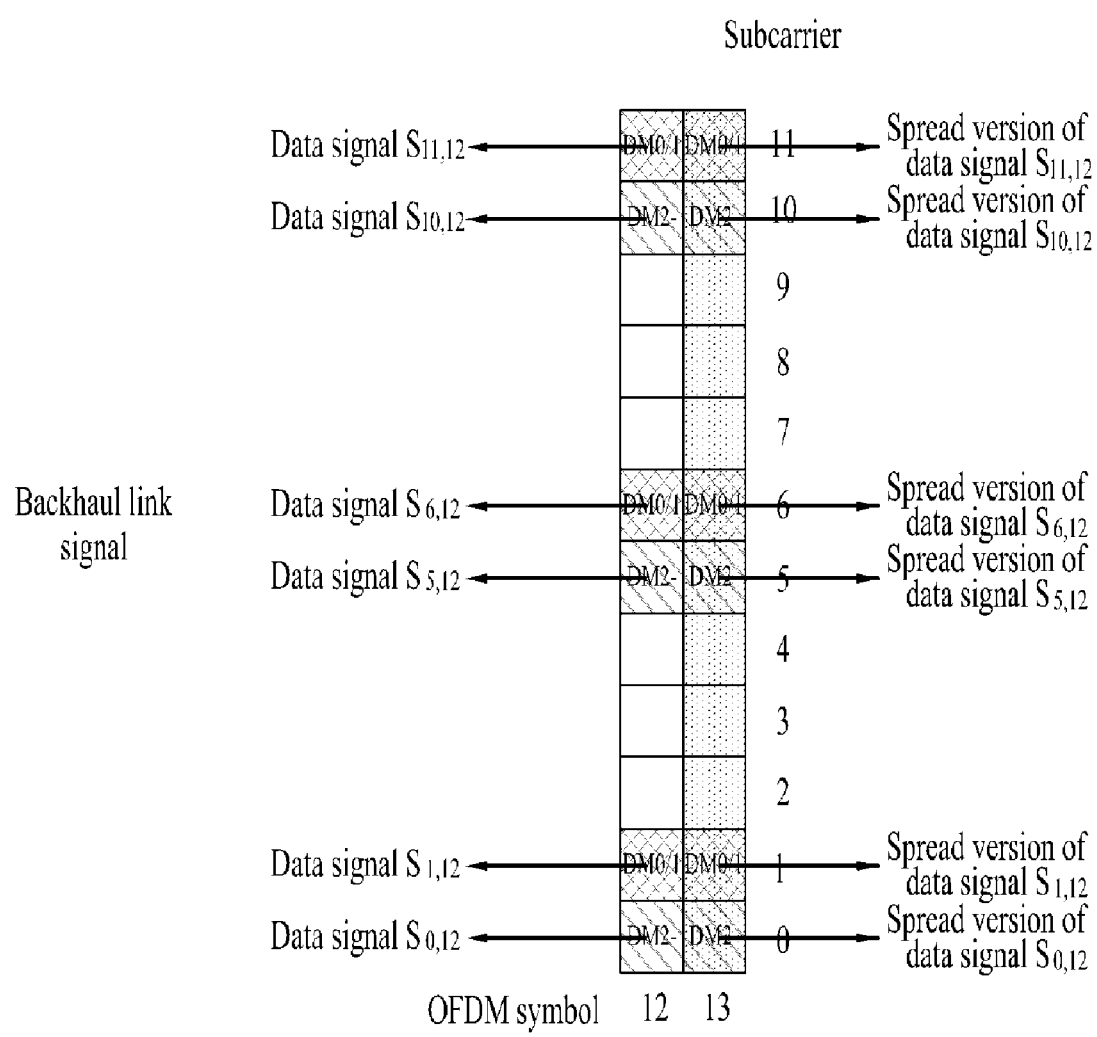
FIGS. 14 and 15 illustrate exemplary signal transmissions in the second slot of a subframe, when the last OFDM symbol of the subframe is not available to a relay.
Figure 15:
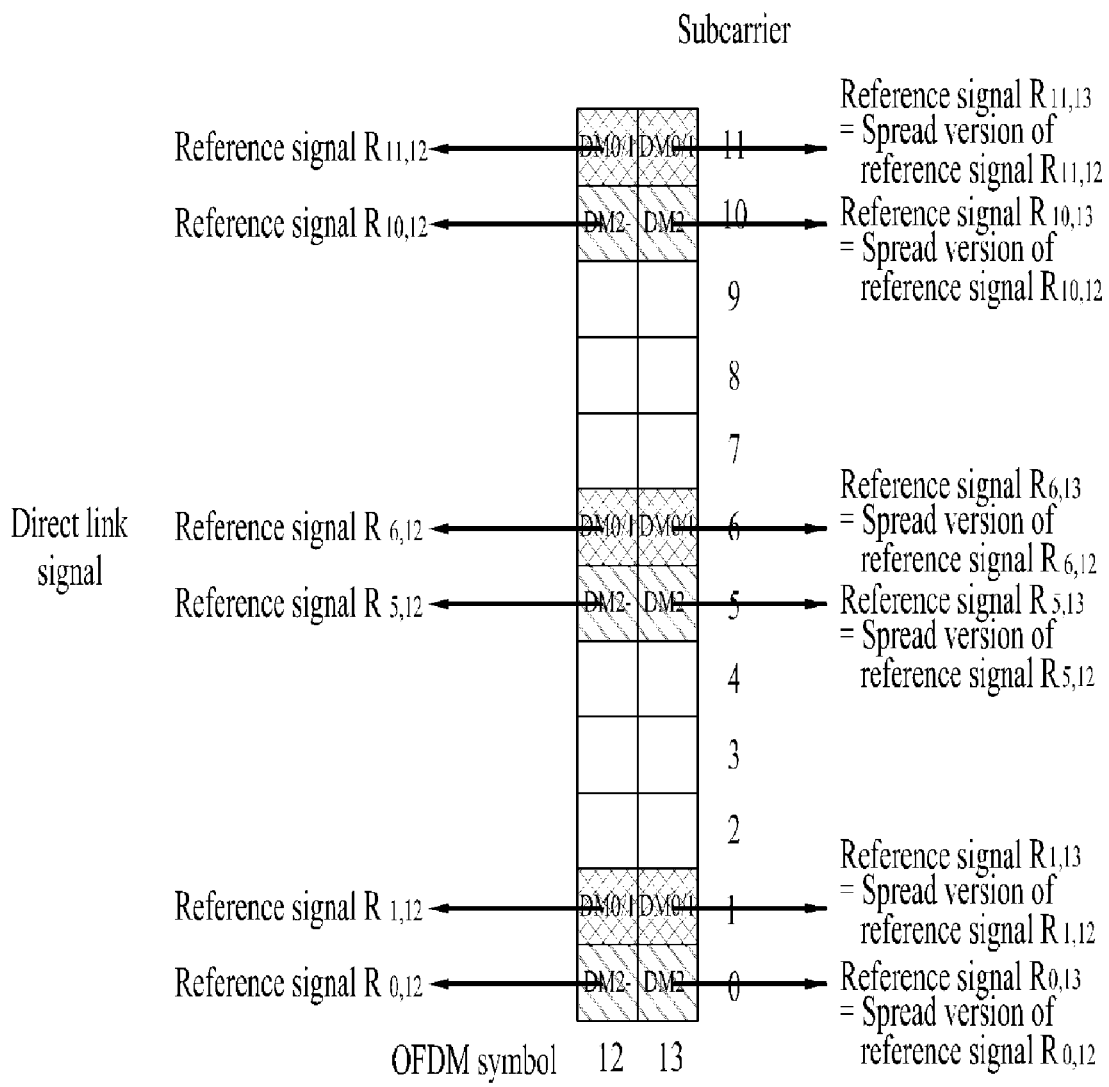

FIGS. 14 and 15 illustrate exemplary signal transmissions in the second slot of a subframe, when the last OFDM symbol of the subframe is not available to a relay. When the afore-described operation is performed, a direct link signal for a UE connected directly to an eNB and a backhaul signal for a relay may be simultaneously transmitted through different layers in the same RB (MultiUser MIMO (MU-MIMO)). In this case, an additional operation is needed to help the UE with accurate DM RS despreading. For this purpose, a backhaul data signal in OFDM symbol 12 is spread with a CDM code used for a DM RS corresponding to the layer of the backhaul data signal and transmitted in a DM RS RE of OFDM symbol 13. This means that the eNB spreads a data signal for a backhaul link with a CDM code used for a DM RS corresponding to the layer of the data signal in OFDM symbols 12 and 13.

Referring to FIGS. 14 and 15, it is assumed that a backhaul signal uses layer 0 and a direct link signal uses layer 1 in MU-MIMO. It is also assumed that the signals of layers 0 and 1 are spread with CDM codes [$w_{0,0}$ and $w_{0,1}$] and [$w_{1,0}$ $w_{1,1}$], respectively in two consecutive DM RS RES. If a data signal S1,12 is to be transmitted as a backhaul signal at subcarrier 1 (k=1) in OFDM symbol 12, the eNB transmits a signal $w_{0,0}$*S$_{1,12}$ at subcarrier 1 in OFDM symbol 12 and a spread version of the data signal S$_{1,12}$, $w_{0,1}$*S$_{1,12}$ at subcarrier 1 in OFDM symbol 13. To facilitate the relay to detect the data signal, the backhaul link DM RS spreading code for OFDM symbol 12 and OFDM symbol 13 is subjected to appropriate phase rotation such that the symbol phase of the spreading code is 0 in OFDM symbol 12 (that is, a CDM code [1 $w_{0,1}/w_{0,0}$] is used to thereby multiply S1,12 by 1 in the above example).

From the perspective of the relay, the relay simply discards the last OFDM symbol of a subframe and demodulates/decodes an R-PDSCH, considering that a data signal is also carried in DM RS REs of the second last OFDM symbol of the subframe. Meanwhile, from the perspective of a UE connected directly to the eNB, if a backhaul signal MU-MIMO-operated with a signal for the UE is transmitted in DM RS REs, the backhaul signal is spread with a code orthogonal to a DM RS of the UE, irrespective of whether the backhaul signal is a data signal or an RS. Therefore, the UE despreads a signal in its DM RS RE and performs channel estimation using the despread signal, as is done when its signal is MU-MIMO-operated with a signal for another UE.

The above-described operation is also applicable to a subframe with 12 OFDM symbols in the case of an extended CP.

Embodiment 2

When a UE is connected directly to an eNB, that is, an access link is established between the UE and the eNB, the eNB transmits DM RSs in both slots of a subframe, as illustrated in FIG. 7. However, DM RSs may not need to be transmitted in both slots of the subframe under circumstances. For example, if a channel changes slowly or is static, no problems may occur to data demodulation even though a channel in another slot is estimated using a DM RS in one slot. Accordingly, DM RS Tx in a slot is selectively enabled or disabled in this embodiment. Thus, DM RS overhead can be reduced.

Figure 16:
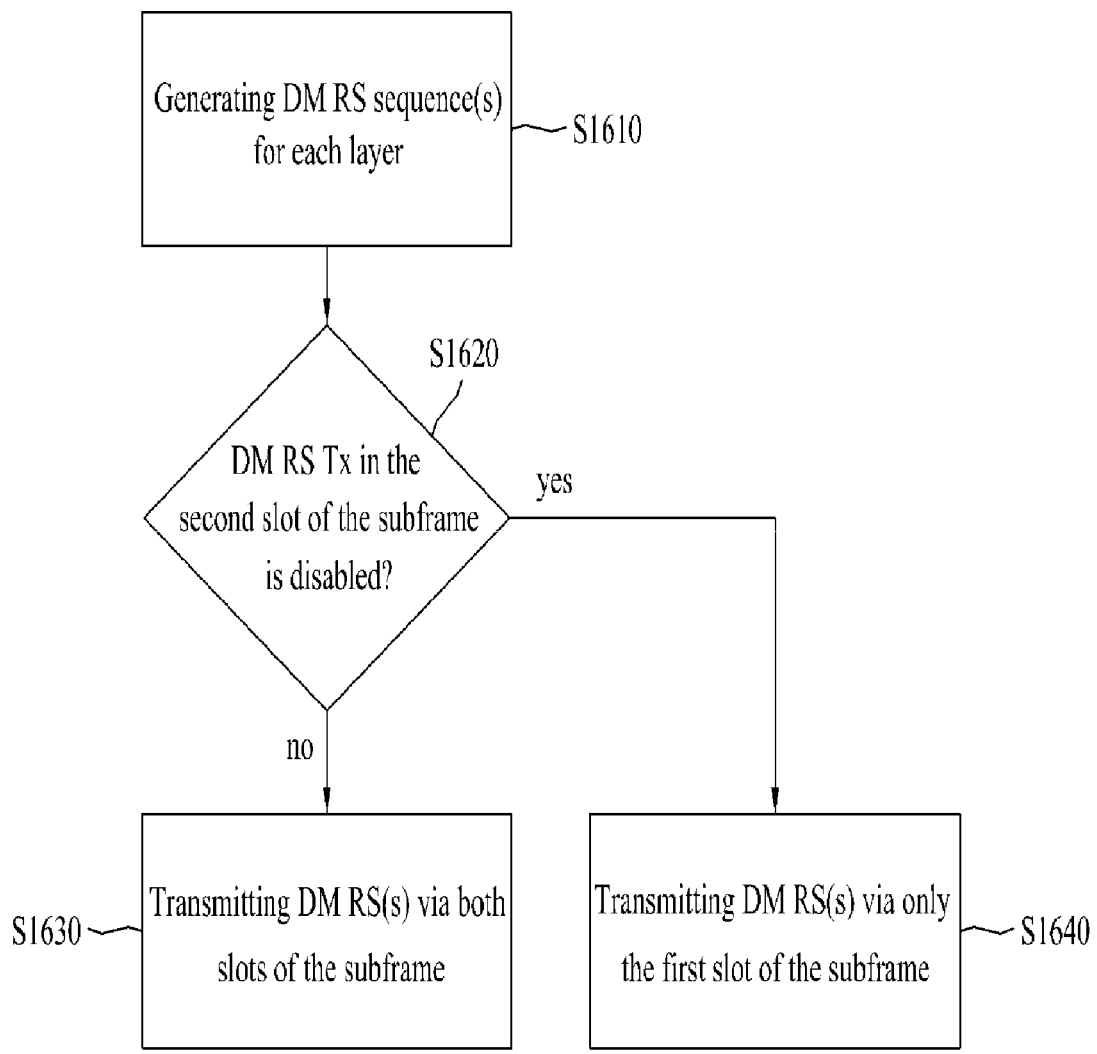
FIG. 16 is a flowchart illustrating a DM RS transmission operation of an eNB according to another embodiment of the present invention.
Figure 17:
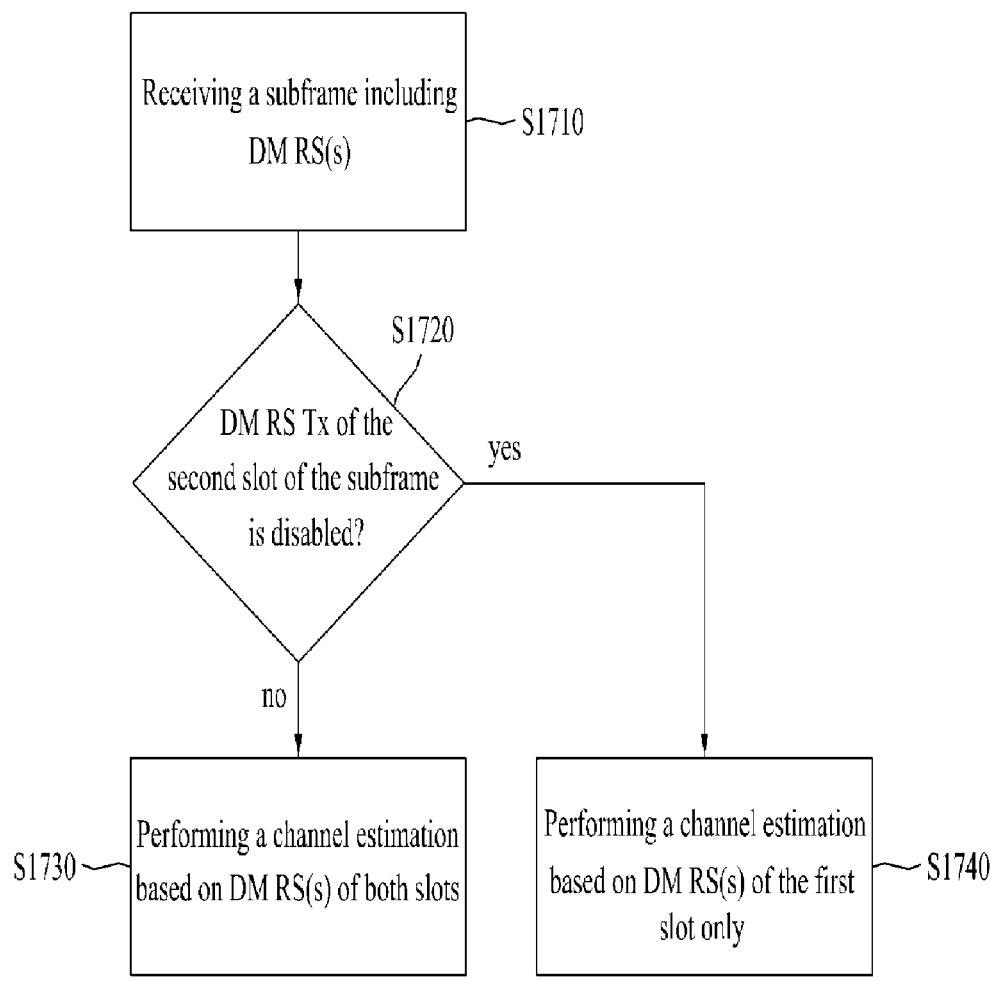
FIG. 17 is a flowchart illustrating a channel estimation operation of a User Equipment (UE) according to another embodiment of the present invention.

FIGS. 16 and 17 illustrate signal processing operations according to another embodiment of the present invention. Specifically, FIG. 16 illustrates a DM RS transmission operation of an eNB and FIG. 17 illustrates a channel estimation operation of a UE.

Referring to FIG. 16, the eNB generates a DM RS sequence (or DM RS sequences) for each layer (S1610). The DM RS sequence may be, but is not limited to, a pseudo-random sequence, a Zadoff-chu sequence, or a CAZAC sequence. Referring to RS sequence generation for antenna port 5 in the legacy LTE system, for example, the DM RS sequence may be defined using [Equation 1] and [Equation 2].

Then the BS determines whether DM RS Tx is disabled in the second slot of a subframe for the UE (S1620). DM RS Tx disable/enable may be set by a higher layer (e.g. an RRC layer) or a physical layer. DM RS Tx disable/enable may be signaled to a LTE in various manners. For instance, the DM RS Tx disable/enable may be indicated semi-statically to the UE through higher layer signaling (e.g. RRC signaling). Additionally, the DM RS Tx disable/enable may be indicated dynamically to the UE through physical layer signaling (e.g. via a PDCCH for DL allocation). Furthermore, information indicating that DM RS disable is allowed and information about the start and duration of the DM RS disable may be transmitted by higher layer signaling and actual DM RS Tx disable/enable may be indicated by physical layer signaling. The DM RS Tx disable/enable may be set, taking into account a channel state (e.g. whether a channel state is (semi-)static).

If the DM RS Tx is not disabled, that is, enabled for the UE in the second slot of a subframe, the eNB transmits a DM RS (or DM RSs) to the UE in be first and second slots of the subframe, for example, in the manner illustrated in FIG. 7 (S1630). On the other hand, if the DM RS Tx is disabled in the second slot for the UE, the eNB transmits a DM RS (or DM RSs) only in the first slot of the subframe (S1640). That is, no DM RSs are transmitted in the second slot of the subframe. In this case, data (an PDSCH) may be mapped to the positions of DM RSs in the second slot of the subframe. Transmission processing of the DM RSs may include, but is not limited to, precoding, RE mapping, and OFDM signal generation.

Referring to FIG. 17, the UE receives a subframe including a DM RS (or DM RSs) from the eNB (S1710). The UE determines whether DM RS Tx is disabled for the second slot of the subframe (S1720). DM RS Tx disable/enable may be set through various types of signaling described with reference to FIG. 16. If the DM RS Tx is enabled for the second slot of the subframe, the UE performs channel estimation using a DM RS (or DM RSs) received in the first and second slots of the subframe (S1730). In this case, the DM RS (or DM RSs) may be received in the manner illustrated in FIG. 7. On the other hand, if the DM RS Tx is disabled for the second slot of the subframe, the UE performs channel estimation based on a DM RS (or DM RSs) received in the first slot of the subframe (S1740). That is, no DM RSs are received in the second slot of the subframe. In this case, data (an PDSCH) may be mapped to the positions of DM RSs in the second slot of the subframe.

Figure 18:
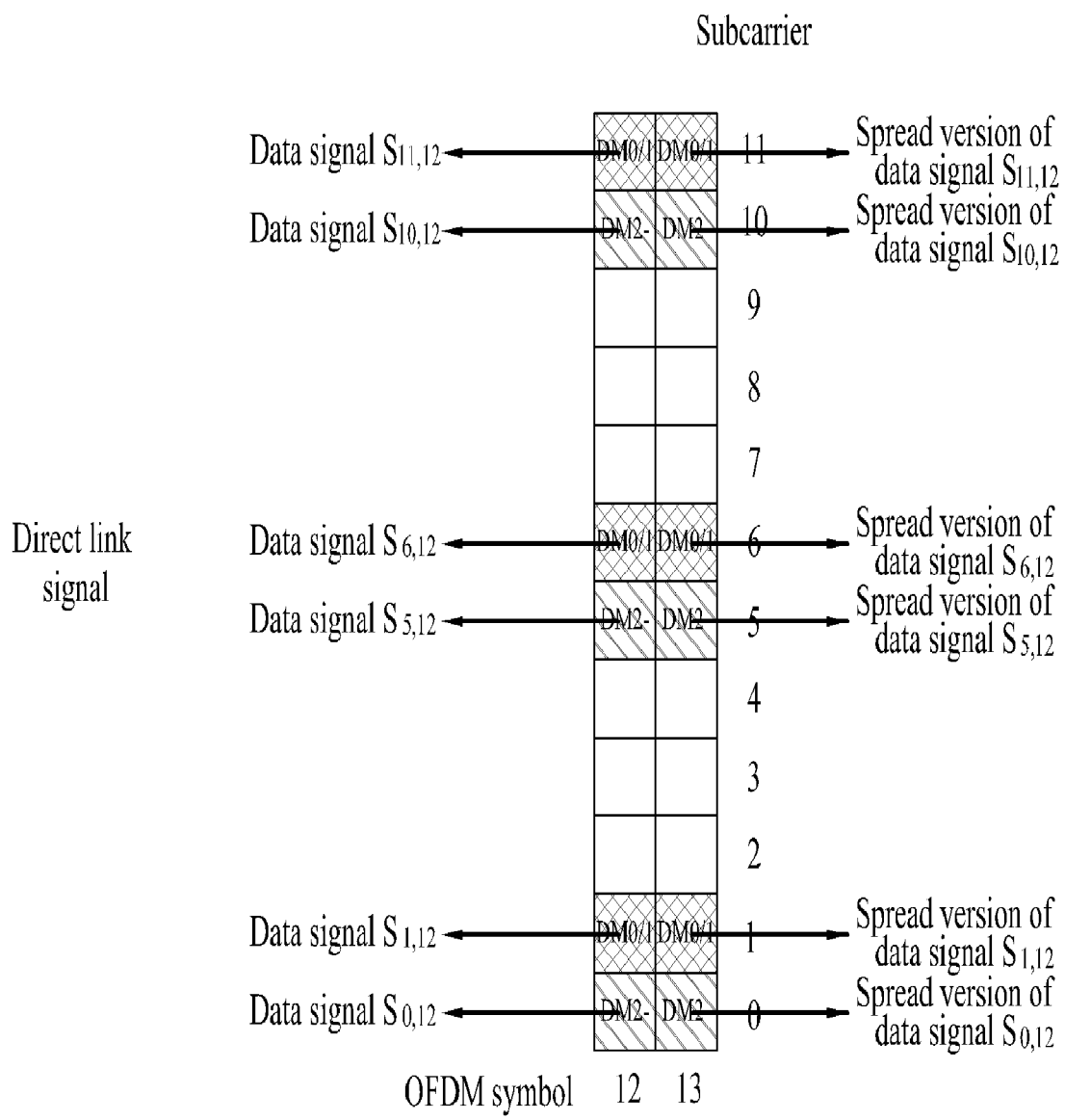
FIG. 18 illustrates an exemplary signal transmission in the second slot of a subframe, when DM RS Transmission (Tx) is disabled for the second slot of the subframe.

FIG. 18 illustrates an exemplary signal transmission in the second slot of a subframe, when DM RS Tx is disabled for the second slot of the subframe. For the sake of convenience, it is assumed that macro UE A uses layer 0 and macro UE B uses layer in MU-MIMO. It is also assumed that signals of layers 0 and 1 are spread with CDM codes [$w_{0,0}$ $w_{0,1}$] and [$w_{1,0}$ $w_{1,1}$], respectively in two consecutive DM RS REs. It is also assumed that DM RS Tx in the second slot of a subframe is disabled for UE A and enabled for UE B.

Referring to FIG. 18, if a data signal Sk,12 is to be transmitted to UE A at subcarrier k (k=1, 6, 11) in OFDM symbol 12, the eNB transmits a signal $w_{0,0}*S_{k,12}$ at subcarrier k in OFDM symbol 12 and a spread version of the signal $w_{0,0}*S_{k,12}$, $w_{0,1}*S_{k,12}$ at subcarrier k in OFDM symbol 13. To facilitate UE A to detect the data signal, the direct link DM RS spreading code for OFDM symbol 12 and OFDM symbol 13 is subjected to appropriate phase rotation such that the symbol phase of the spreading code is 0 in OFDM symbol 12 (for example, a CDM code [1 $w_{0,1}/w_{0,0}$] is used).

Therefore, UE A simply discards only DM RS REs in the last OFDM symbol of a subframe and demodulates/decodes a PDSCH, considering that a data signal is also carried in DM RS REs of the second last OFDM symbol of the subframe. In addition, UE A may demodulate/decode the PDSCH after despreading signals carried in DM RS REs of the second slot. UE A uses the DM RSs of the first slot for PDSCH demodulation of the first/second slot.

In another method (not shown), the eNB may transmit the data signal Sk,12 at subcarrier k in OFDM symbol 12 and a different data signal Sk,13 at subcarrier k in OFDM symbol 13. That is, each DM RS RE of the second slot may be used for PDSCH transmission without any restriction. In this case, UE A may perform PDSCH demodulation/decoding, considering that data signals are transmitted in all DM RS REs of the second slot.

Meanwhile, UE B assumes that a signal for UE A MU-MIMO-operated with a signal for UE B and transmitted in DM RS REs was spread with a code orthogonal to a DM RS of UE B irrespective of whether the signal for UE A is a data signal or an RS. Therefore, UE B performs channel estimation after despreading signals in DM RS REs of the second slot.

The above-described operation is also applicable to a subframe with 12 OFDM symbols in the case of an extended CP. While the above description has been given in the context of DM RS Tx enable/disable in the second slot of a subframe, the same thing applies to the first slot of the subframe, if DM RS Tx enable/disable is set for the first slot of the subframe. It is also possible to change a slot to which DM RS Tx disable/enable is applied according to a preset pattern or through signaling. For example, a slot for which DM RS Tx is disabled may be indicated by higher layer signaling (e.g. RRC signaling) or via a PDCCH for DL allocation (e.g. a PDCCH for PDSCH scheduling).

Figure 19:
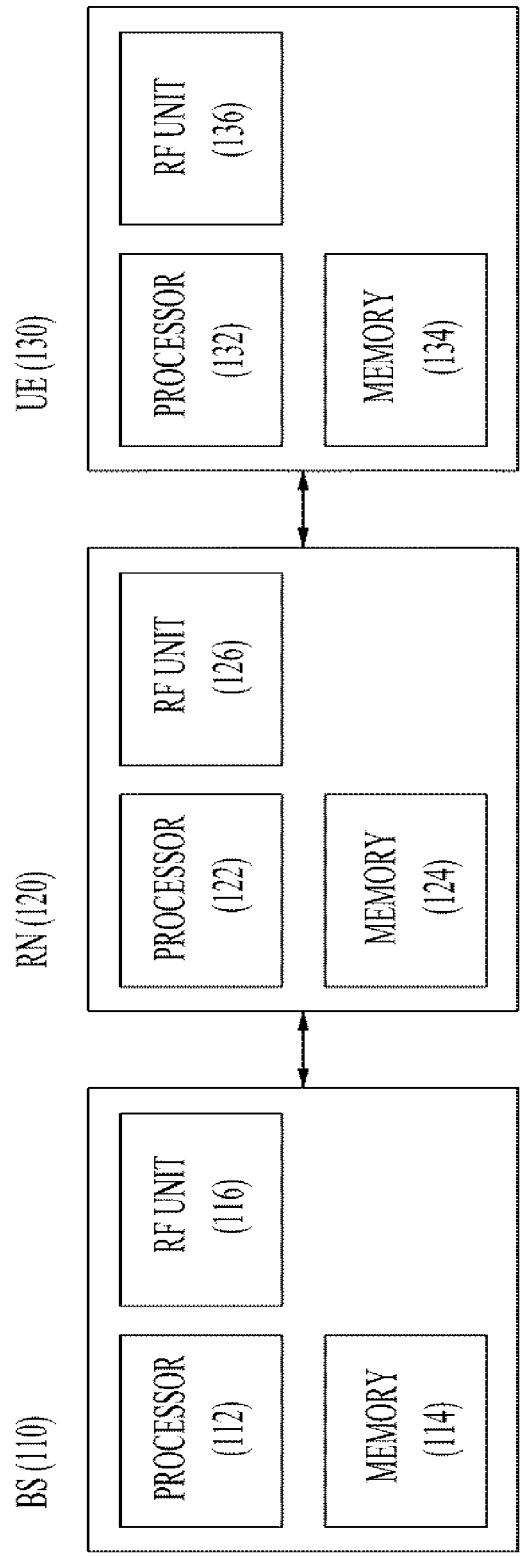
FIG. 19 is a block diagram of a Base Station (BS), a relay or Relay Node (RN), and a UE that are applicable to the present invention.

FIG. 19 is a block diagram of a Base Station (BS), an RN, and a UE which are applicable to the present invention.

Referring to FIG. 19, a wireless communication system includes a BS 110, an RN 120, and a UE 130.

The BS 110 includes a processor 112, a memory 114, and an RE unit 116. The processor 112 may be configured so as to implement the procedures and/or methods of the present invention. The memory 114 is connected to the processor 112 and stores various pieces of information related to operations of the processor 112. The RF unit 116 is connected to the processor 112 and transmits and/or receives RE signals. The relay 120 includes a processor 122, a memory 124, and an RE unit 126. The processor 122 may be configured so as to implement the procedures and/or methods of the present invention. The memory 124 is connected to the processor 122 and stores various pieces of information related to operations of the processor 122. The RF unit 126 is connected to the processor 122 and transmits and/or receives RE signals. The UE 130 includes a processor 132, a memory 134, and an RF unit 136. The processor 132 may be configured so as to implement the procedures and/or methods of the present invention. The memory 134 is connected to the processor 132 and stores various pieces of information related to operations of the processor 132. The RF unit 136 is connected to the processor 132 and transmits and/or receives RE signals. The BS 110, the relay 120 and/or the UE 130 may have a single or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes corning within the meaning and equivalency range of the appended claims are intended to be embraced therein.

INDUSTRIAL APPLICABILITY

The present invention relates to a wireless communication system. Particularly, the present invention is applicable to a method and apparatus for transmitting a signal via a relay backhaul link in a wireless communication system.

What is claimed is:

1. A method for receiving a signal by a relay in a wireless communication system, the method comprising:

receiving, by the relay from a base station (BS), a reference signal (RS) in a subframe having a first slot and a second slot, wherein each of the first and second slots includes a plurality of consecutive resource elements over which the RS is allowed to be spread, and the plurality of consecutive resource elements overlaps a last Orthogonal Frequency Division Multiplexing (OFDM) symbol of a corresponding slot, and wherein, when the last OFDM symbol of the subframe is not available for transmission from the BS to the relay, the RS is received only in the first slot of the subframe and a data signal is received in at least part of the plurality of consecutive resource elements in the second slot.

2. The method according to claim 1, wherein, if the last OFDM symbol of the subframe is available for transmission from the BS to the relay, the RS is received in both of the first and second slots of the subframe.

3. The method according to claim 1, wherein the consecutive resource elements in each of the first and second slots are consecutive in time in each of the first and second slots, respectively.

4. The method according to claim 1, wherein the plurality of consecutive resource elements are two resource elements consecutive in time in each of the first and second slots.

5. The method according to claim 1, wherein the at least part of the plurality of consecutive resource elements corresponds to resource elements which do not overlap the last OFDM symbol of the subframe from among the plurality of consecutive resource elements in the second slot of the subframe.

6. The method according to claim 1, wherein the RS is spread with an orthogonal code.

7. The method according to claim 1, wherein the data signal is spread with an orthogonal code used for spreading the RS in the plurality of consecutive resource elements in the second slot of the subframe.

8. A relay in a wireless communication system, the relay comprising:

a Radio Frequency (RF) unit; and a processor configured to control the RF unit to receive a reference signal (RS) from a base station (BS) in a subframe having a first slot and a second slot, wherein each of the first and second slots includes a plurality of consecutive resource elements over which the RS is allowed to be spread, and the plurality of consecutive resource elements overlap a last Orthogonal Frequency Division Multiplexing (OFDM) symbol of a corresponding slot, and wherein, when the last OFDM symbol of the subframe is not available for transmission from the BS to the relay, the RS is received only in the first slot of the subframe and a data signal is received in at least part of the plurality of consecutive resource elements in the second slot.

9. The relay according to claim 8, wherein, if the last OFDM symbol of the subframe is available for transmission from the BS to the relay, the RS is received in both of the first and second slots of the subframe.

10. The relay according to claim 8, wherein the consecutive resource elements in each of the first and second slots are consecutive in time in each of the first and second slots, respectively.

11. The relay according to claim 8, wherein the plurality of consecutive resource elements are two resource elements consecutive in time in each of the first and second slots.

12. The relay according to claim 8, wherein the at least part of the plurality of consecutive resource elements corresponds to resource elements which do not overlap the last OFDM symbol of the subframe from among the plurality of consecutive resource elements in the second slot of the subframe.

13. The relay according to claim 8, wherein the RS is spread with an orthogonal code.

14. The relay according to claim 8, wherein the data signal is spread with an orthogonal code used for spreading the RS in the plurality of consecutive resource elements in the second slot of the subframe.

* * * * *